(12) United States Patent
Maeda (10) Patent No.: US 7,087,929 B2
(45) Date of Patent: Aug. 8, 2006

(54) LIQUID CRYSTAL DISPLAY DEVICE AND ELECTRONIC APPARATUS

(75) Inventor: Tsuyoshi Maeda, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/826,364

(22) Filed: Apr. 19, 2004

(65) Prior Publication Data

US 2005/0036093 A1    Feb. 17, 2005

(30) Foreign Application Priority Data

May 2, 2003  (JP)  ............................. 2003-127323

(51) Int. Cl.
*H01L 29/04*  (2006.01)
*G02F 1/1333*  (2006.01)
*G02F 1/1343*  (2006.01)

(52) U.S. Cl. .................. 257/59; 257/E27.131; 349/54; 349/143

(58) Field of Classification Search ................. 257/59; 349/54, 143
See application file for complete search history.

(56) References Cited

U.S. PATENT DOCUMENTS 5,434,690 A * 7/1995 Hisatake et al. ............. 349/8
6,452,654 B1 * 9/2002 Kubo et al. ............... 349/114
6,661,488 B1   12/2003 Takeda et al.
6,724,452 B1   4/2004 Takeda et al.
2002/0021395 A1 * 2/2002 Koma et al. .............. 349/141
2004/0119924 A1   6/2004 Takeda et al.

FOREIGN PATENT DOCUMENTS

JP  A 2002-350853  12/2002
KR  1999-006951  1/1999

* cited by examiner

*Primary Examiner*—David Nelms
*Assistant Examiner*—Long Tran
(74) *Attorney, Agent, or Firm*—Oliff & Berridge, PLC (57) ABSTRACT

The invention provides a liquid crystal display device that prevents problems in display, such as afterimages, achieves a high brightness and contrast, and in particular, provides a wide viewing angle. The liquid crystal display device of the invention can include a pair of substrates, a liquid crystal layer interposed therebetween, common electrodes in the form of stripes disposed on the inner surface of the substrate, and pixel electrodes in the form of rectangles disposed on the inner surface of the other substrate. In the liquid crystal display device, the liquid crystal layer can be composed of liquid crystal molecules with negative dielectric anisotropy, which are vertically aligned in an initial state. Further, outer edges of the pixel electrodes can be positioned inside or outside the corresponding outer edges of the common electrodes so that the tilt directions of the vertically aligned liquid crystal molecules are controlled.

7 Claims, 10 Drawing Sheets

LIQUID CRYSTAL DISPLAY DEVICE AND ELECTRONIC APPARATUS

BACKGROUND OF THE INVENTION

1. Field of Invention

The present invention relates to liquid crystal display devices and electronic apparatuses, and in particular, to a liquid crystal display device that provides a display with a high contrast and wide viewing angle.

2. Description of Related Art

To achieve a wide viewing angle in the liquid crystal display device, for example, Japanese Unexamined Patent Application Publication No. 2002-350853, proposes a transflective liquid crystal display device using vertically aligned liquid crystal molecules. This is characterized as follows:

1) A "vertical alignment (VA) mode" is adopted. In this mode, liquid crystal molecules with negative dielectric anisotropy are aligned orthogonal to substrates and tilted by applying a voltage.

2) A "multi-gap structure" is adopted. That is, the thickness of a liquid crystal layer (cell gap) in transmissive display areas is different from that in reflective display areas.

3) A "multi-domain structure" is adopted. In this structure, transmissive display areas are arranged as regular octagons or circles, and protrusions are provided at the centers of the transmissive display areas in a counter substrate so that liquid crystal molecules are isotropically tilted within these areas.

SUMMARY OF THE INVENTION

As described above, Japanese Unexamined Patent Application Publication No. 2002-350853 describes a liquid crystal display device provided with protrusions, at the centers of the transmissive display areas, for controlling the alignment of the liquid crystal molecules. However, there is no mention of the control of the alignment of liquid crystal molecules in the reflective display areas, which are adjacent to the transmissive display areas. Moreover, poor alignment may occur at edges of pixels, the protrusions provided at the centers of the transmissive display areas, as disclosed in Japanese Unexamined Patent Application Publication No. 2002-350853, may not perfectly control the alignment of the liquid crystal molecules, and further, improper alignment called disclination may cause problems in display, such as afterimages. Since each alignment area of the liquid crystal molecules has different viewing angle characteristics, unevenness, which may lead to degradation in display quality, is seen in the liquid crystal display device when viewed from an angle.

An object of the invention is to provide a liquid crystal display device that prevents problems in display, such as afterimages, achieves a high brightness and contrast, and in particular, provides a wide viewing angle.

To achieve the object described above, the liquid crystal display device of the invention can include a pair of substrates, a liquid crystal layer interposed therebetween, common electrodes in the form of stripes disposed on the inner surface of one of the substrates, and pixel electrodes in the form of rectangles disposed on the inner surface of the other substrate. Further, the liquid crystal layer can be composed of liquid crystal molecules with negative dielectric anisotropy, which are vertically aligned in an initial state, and outer edges of the pixel electrodes are positioned inside or outside the corresponding outer edges of the common electrodes so that the tilt directions of the vertically aligned liquid crystal molecules are controlled.

In this liquid crystal display device, the liquid crystal layer can be composed of the liquid crystal molecules with negative dielectric anisotropy, which are vertically aligned in an initial state, and the tilt directions of the vertically aligned liquid crystal molecules are controlled depending on the positional relationship between the rectangular pixel electrodes and the strip common electrodes. This prevents improper alignment and problems in display, such as afterimages, caused by the improper alignment. In other words, tilted electric fields are produced between the pixel electrodes and the common electrodes by positioning the outer edges of the pixel electrodes inside or outside the corresponding outer edges of the common electrodes, so that the tilt directions of the liquid crystal molecules are controlled depending on the tilted electric fields. The tilt directions of the liquid crystal molecules can thus be well controlled without providing protrusions on the electrodes, as disclosed in the related art. As a result, problems in display caused by improper alignment of the liquid crystal molecules are prevented. Since the tilt directions of the liquid crystal molecules can be controlled even in the edges (outer edges) of a pixel, the display quality in all the display areas is further improved.

Moreover, in the liquid crystal display device of the invention, the strip common electrodes and the rectangular pixel electrodes can partially overlap each other, at least in plan view. Further, a plurality of the pixel electrodes are arranged along the long sides of the strip common electrodes. When one outer edge of the pixel electrode is positioned inside or outside the corresponding outer edge of the common electrode in its width direction, the tilt direction of the liquid crystal molecules can be effectively controlled in the edge of the pixel electrode, as described above.

On the pixel electrodes and/or the common electrodes, slit apertures and/or protrusions are provided for controlling the tilt directions of the vertically aligned liquid crystal molecules. The outer edges of one of a pixel electrode and a common electrode having the outermost apertures and/or protrusions within one pixel are positioned outside the outer edges of the other electrode.

Since the outer edges of one of the pixel electrode and the common electrode (for example, the pixel electrode) having the outermost apertures and/or protrusions within the pixel are positioned outside the outer edges of the other electrode (for example, the common electrode), apertures (also called terminal apertures) are positioned at the outer edges of the other electrode (for example, the common electrode). Therefore, the outermost apertures and/or protrusions within the pixel and the corresponding terminal apertures provided on the other electrode control the alignment of the liquid crystal molecules. Thus, improper alignment is prevented, and problems in display, such as afterimages and unevenness when viewed from an angle, are also prevented.

The apertures and/or the protrusions for controlling the alignment of the liquid crystal molecules are provided on both the pixel electrodes and the common electrodes, and are alternately arranged on the different electrodes. Since the apertures and/or protrusions that are next to each other are separately provided on the different electrodes, improper alignment of the liquid crystal molecules is prevented, and thus problems in display, such as afterimages and unevenness when viewed from an angle, are prevented. In the apertures and/or protrusions alternately provided on the different electrodes, the outermost apertures and/or protrusions within the pixel correspond to the terminal apertures provided on the other electrode. The liquid crystal molecules are thus perfectly aligned in multiple domains from the centers to the edges of the pixels, and the liquid crystal display device with a remarkably high display quality can be provided.

Further, the outer edges of the pixel electrodes are positioned approximately W/2 inside or outside the outer edges of the common electrodes, where W is the width of an aperture and/or a protrusion. Similarly to the effect of the apertures and/or the protrusions on the electrodes, this allows the tilted electric fields to be applied from the edges to the inside of the pixel. If the displacement distance between the outer edges of the pixel electrode and the common electrode is below W/2, the effect of the tilted electric fields may be reduced. On the other hand, if the displacement distance is above W/2, areas where no electrode is provided increase. This leads to undesirable reduction in the aperture ratio, since the liquid crystal molecules are not driven in such areas.

In the liquid crystal display device of the invention, moreover, each of a plurality of dot areas includes a transmissive display area for transmissive mode and a reflective display area for reflective mode. Further, adjusting layers can be disposed between at least one of the substrates and the liquid crystal layer, and at least in the reflective display area, the adjusting layer being disposed for varying the thickness of the liquid crystal layer between the reflective display area and the transmissive display area.

In this liquid crystal display device, the adjusting layers, which are disposed for making the thickness of the liquid crystal layer in the reflective display area different from that in the transmissive display area, reduce the difference in retardation between the reflective display area and the transmissive display area. In other words, in reflective mode, the light entering from the display surface passes through the liquid crystal layer twice to be provided for display. In transmissive mode, on the other hand, the light entering from the backside passes through the liquid crystal layer just once. Although this produces the difference in retardation between display modes, the adjusting layers for adjusting the thickness of the liquid crystal layer reduce the difference in retardation, and further, prevent the resultant degradation in contrast. In the liquid crystal display device that can provide a high contrast display in both the transmissive mode and reflective mode, since the liquid crystal molecules are effectively aligned in multiple domains even in the edges of the pixels, problems in display, such as afterimages, are prevented in both the transmissive and reflective modes. Thus, the liquid crystal display device with a high contrast and wide viewing angle can be provided.

The liquid crystal display device of the invention further includes a black matrix disposed between the neighboring dot areas. The black matrix is disposed outside the outer edge of one of the pixel electrode and the common electrode having the outer edge being positioned inside that of the other electrode. In known liquid crystal display devices, black matrices normally cover the edges (outer edges) of pixels. According to the liquid crystal display device of the invention, however, the liquid crystal molecules even in the vicinity of the edges are driven by the tilted electric fields. Therefore, a bright display in the area between the outer edges of the pixel electrode and the common electrode is ensured, and a black matrix of smaller size is required compared to that previously required. In the invention, a display with higher brightness can thus be achieved by disposing the black matrix outside the outer edge of one of the pixel electrode and the common electrode, the outer edge being positioned relatively inside.

In the liquid crystal display device of the invention, two-terminal nonlinear elements are connected to the pixel electrodes. Examples of the two-terminal nonlinear elements include a thin film diode (hereinafter, abbreviated as TFD) element having the structure of metal-insulator-metal (MIM) type nonlinear element.

In the invention, the apertures (for example, slit apertures) provided on the electrodes tilt the electric fields (potential lines) in the vicinity of the apertures, the electric fields being produced between the electrodes of both the substrates. The alignment of the liquid crystal molecules is thus easily controlled by the tilted electric fields. Similarly, when the protrusions (for example, dielectric protrusions) are provided on the electrodes, the protrusions protruding into the liquid crystal layer control the alignment of the liquid crystal molecules.

An electronic apparatus of the invention can include the liquid crystal display device of the invention described above. Accordingly, an electronic apparatus having a liquid crystal display with a high brightness regardless of the environment, a high contrast, and a wide viewing angle can be provided. This electronic apparatus is particularly suitable for applications where transmissive display is important.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Embodiments of the invention will now be described with reference to the drawings. In each drawing, each layer and member is illustrated at different scales for better viewability.

A liquid crystal display device of the present embodiment is an example of an active matrix liquid crystal display device using a TFD serving as a switching element, and in particular, a transflective liquid crystal display device that is capable of displaying in both the reflective mode and transmissive mode.

Figure 1:
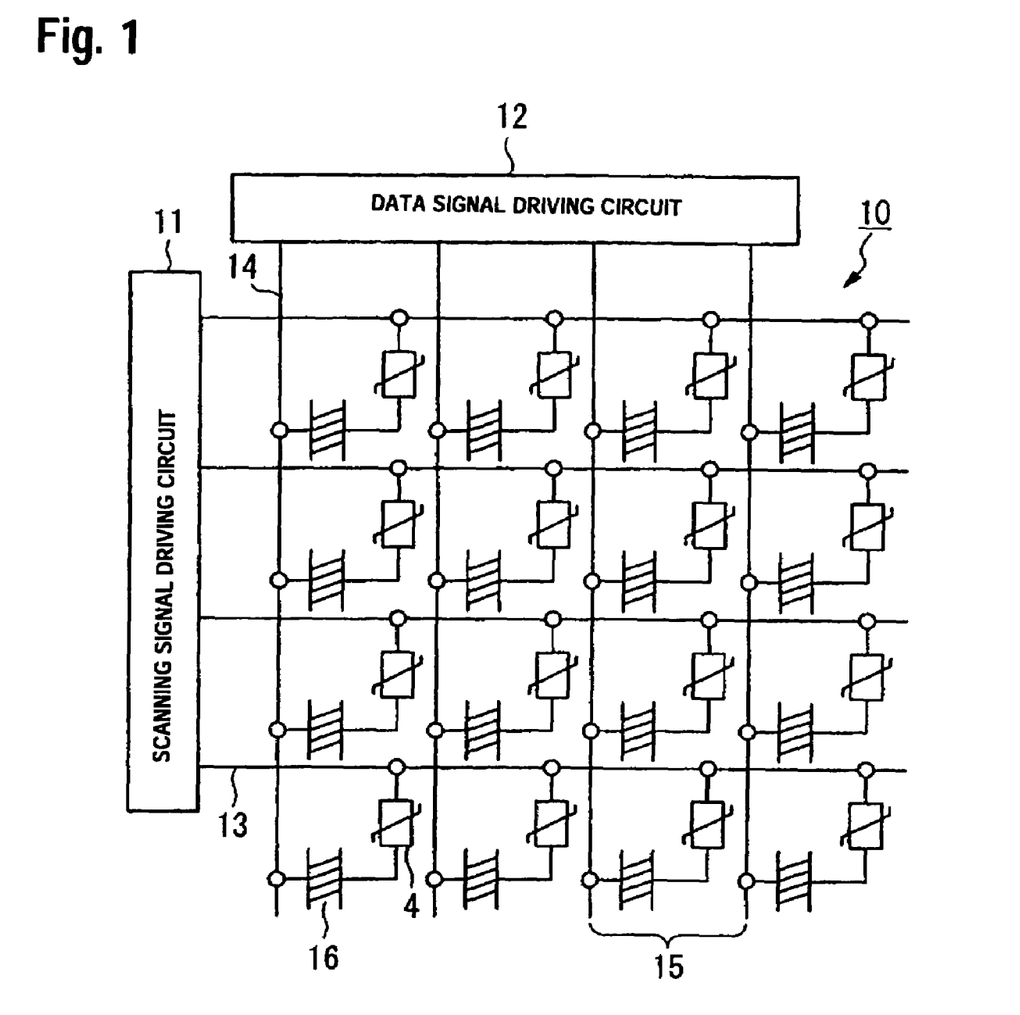
FIG. 1 is an exemplary circuit diagram of the liquid crystal display device according to the first embodiment.

FIG. 1 is an equivalent circuit diagram of a liquid crystal display device 10 according to the present embodiment. The liquid crystal display device 10 can include a scanning signal driving circuit 11 and a data signal driving circuit 12. The liquid crystal display device 10 has signal lines, that is, a plurality of intersecting scanning lines 13 and data lines 14 that are driven by the scanning signal driving circuit 11 and the data signal driving circuit 12, respectively. Each pixel area 15 can include a TFD element 4 and a liquid crystal display element 16 (liquid crystal layer) that are connected in series between the scanning line 13 and the data line 14. In FIG. 1, the TFD element 4 and the liquid crystal display element 16 are connected to the scanning line 13 and the data line 14, respectively. Alternatively, the TFD element 4 and the liquid crystal display element 16 may be connected to the data line 14 and the scanning line 13, respectively.

Figure 2:
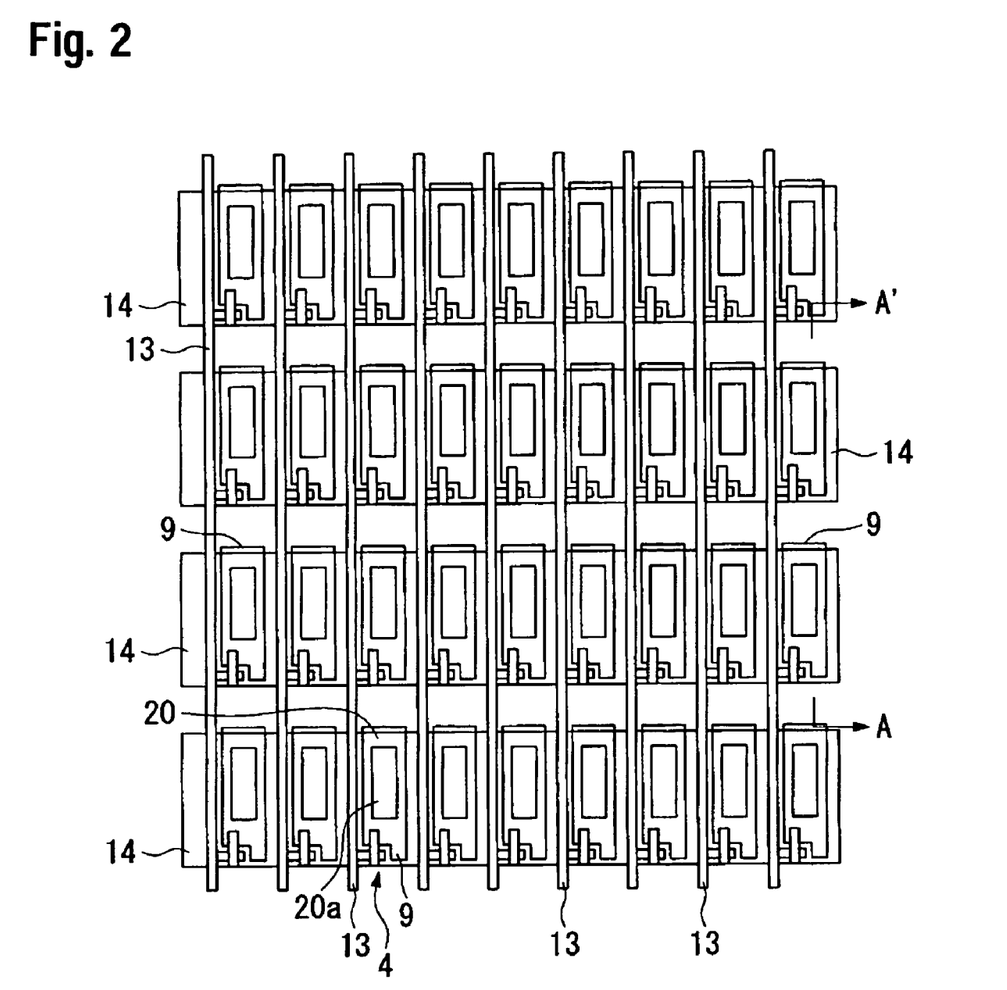
FIG. 2 is a plan view showing the formation of the electrodes in the liquid crystal display device illustrated in FIG. 1.

FIG. 2 is a plan view showing the formation of electrodes incorporated in the liquid crystal display device according to the embodiment. As shown in FIG. 2, the liquid crystal display device of the embodiment has pixel electrodes 9 arranged in a matrix. Each pixel electrode 9 is connected to the scanning line 13 via the TFD element 4, and is rectangular in plan view. The pixel electrodes 9 oppose common electrodes 14, which are arranged in stripes, along the direction orthogonal to the plane of the drawing. The common electrodes 14 are formed of the data lines and have the forms of stripes crossing the scanning lines 13. According to the embodiment, each of a plurality of areas including one pixel electrode 9 constitutes one dot area. Each of the dot areas arranged in a matrix has a display capability.

Each dot area has a reflective film 20 including an aperture 20a. The reflective film 20 constitutes a reflective display area, and its inner area where no reflective film 20 is provided (inner area of the aperture 20a) constitutes a transmissive display area.

Figure 3:
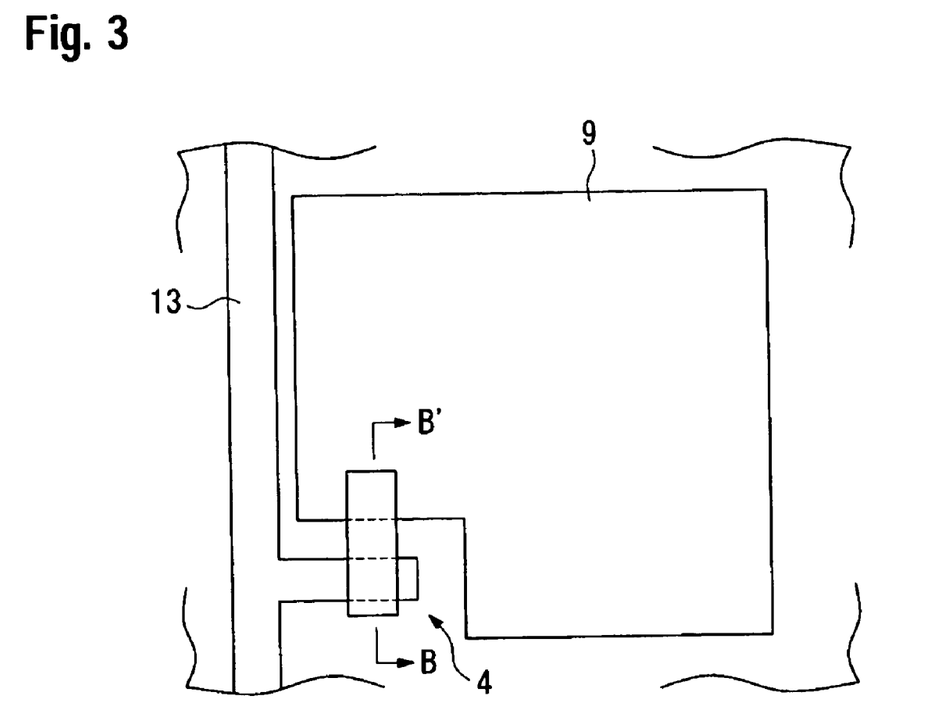
FIG. 3 is a plan view showing the structure of the switching element of the liquid crystal display device illustrated in FIG. 1.
Figure 4:
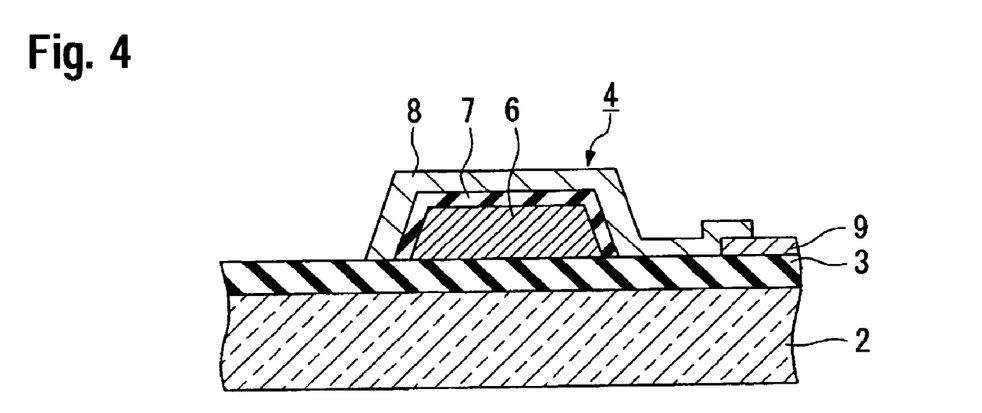
FIG. 4 shows a cross-section along B–B' in FIG. 3.

Here, the TFD element 4 has a structure, for example, as illustrated in FIGS. 3 and 4. FIG. 3 is a plan view showing the structure of the TFD element 4, and FIG. 4 shows a cross-section along B–B' in FIG. 3.

FIG. 3 shows the TFD element 4 serving as a switching element for connecting the scanning line 13 and the pixel electrode 9. As shown in FIG. 4, the TFD element 4 is disposed on a substrate 2 via a base insulating film 3. The TFD element 4 is formed of a first conductive film 6 having tantalum (Ta) as the main ingredient, an insulating film 7 disposed on the first conductive film 6 and having tantalum oxide ($Ta_2O_3$) as the main ingredient, and a second conductive film 8 disposed on the insulating film 7 and having chromium (Cr) as the main ingredient. The first conductive film 6 and the second conductive film 8 are connected to the scanning line 13 and to the pixel electrode 9, respectively.

Figure 5:
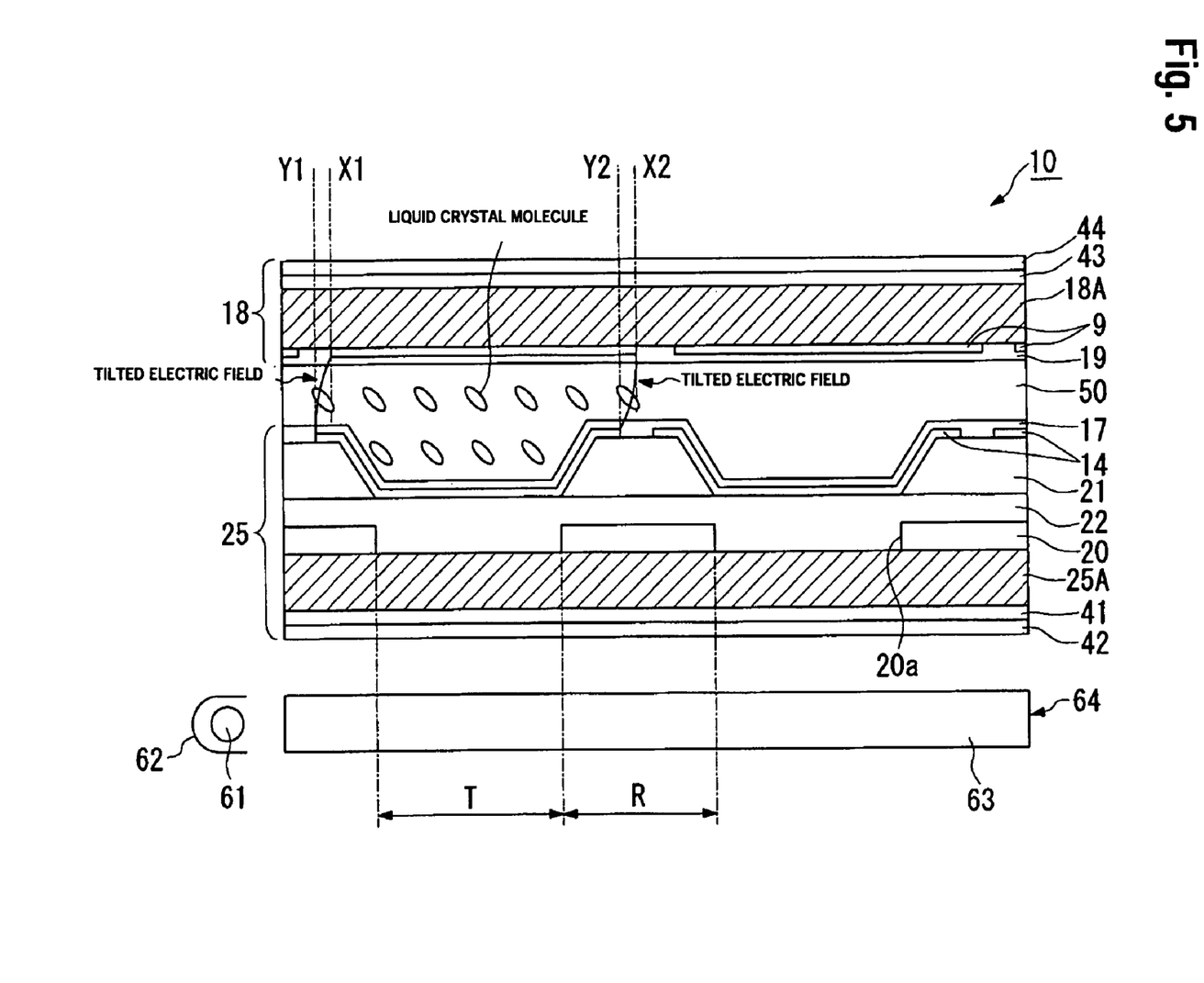
FIG. 5 is a cross-sectional view of the liquid crystal display device illustrated in FIG. 1.

With reference to FIG. 5, which shows a cross-section along A–A' in FIG. 2, the structure of the liquid crystal display device 10 according to the present embodiment will now be described.

As shown in FIG. 5, the liquid crystal display device 10 of this embodiment has a TFD array substrate 18 and a counter substrate 25, and a liquid crystal layer 50 interposed therebetween. The liquid crystal layer 50 is composed of liquid crystal molecules with negative dielectric anisotropy, which are vertically aligned in an initial state. A backlight 64 is provided on the side distant from a display surface of the liquid crystal display device 10, that is, on the backside of the counter substrate 25.

In the counter substrate 25, the reflective film 20, which is composed of a metal film with high reflectance, such as aluminum or silver, is disposed on the surface of a base 25A, which is composed of translucent material, such as quartz or glass. As described above, the areas where the reflective films 20 are provided constitute reflective display areas R, and the areas where no reflective film 20 is provided (inner areas of the apertures 20a) constitute transmissive display areas T.

A dye layer 22 constituting a color filter is disposed on the reflective film 20 in the reflective display area R, and on the base 25A in the transmissive display area T. In the dye layer 22, one of three different colors, red (R), green (G), and blue (B), is assigned to each of neighboring dot areas, and the three neighboring dot areas constitute one pixel.

Insulating films 21 are disposed on the dye layer 22 of the color filter at locations corresponding to the reflective display areas R. The insulating film 21 has a thickness of, for example, about 2 μm±1 μm and can be composed of an organic film, such as acrylic resin. At the boundary between the reflective display area R and the transmissive display area T, the insulating film 21 has an inclined area with an inclined surface for gradually changing the thickness thereof. In an area where no insulating film 21 is provided, the liquid crystal layer 50 has a thickness of about 2 to 6 μm. Therefore, the thickness of the liquid crystal layer 50 in the reflective display area R is about half that in the transmissive display area T. That is, the insulating film 21 serves as an adjusting layer that makes the thickness of the liquid crystal layer 50 in the reflective display area R different from that in the transmissive display area T.

Common electrodes 14 made of a transparent conductive film, such as indium tin oxide (hereinafter, abbreviated as ITO) are provided in a surface of the counter substrate 25, the surface including surfaces of the insulating films 21. In FIG. 5, the common electrodes 14 extend in the direction orthogonal to the plane of the drawing and are arranged in stripes. Each common electrode 14 serves as a common electrode for a plurality of dot areas arranged in the direction orthogonal to the plane of the drawing. A vertical alignment film 17 is disposed on the common electrodes 14 to provide vertical orientation to liquid crystal molecules of the liquid crystal layer 50.

In the TFD array substrate 18, on the other hand, the pixel electrodes 9 composed of a transparent conductive film, such as ITO, and a vertical alignment film 19 are disposed, in order, on the inner surface of a base 18A composed of translucent material such as glass or quartz. Although treatment for vertical alignment is applied to both the vertical alignment films 17 and 19 of the counter substrate 25 and the TFD array substrate 18, respectively, no treatment, such as rubbing, for creating pretilt angles is provided.

On the display surface side of the TFD array substrate 18, a retardation film 43 disposed on the base 18A is overlaid with a polarizer 44. Similarly, on the backside of the counter substrate 25, a retardation film 41 disposed on the base 25A is overlaid with a polarizer 42. Each of the retardation films 43 and 41 provides a phase difference of about ¼ of the wavelength of visible light. The combination of the retardation films 43 and 41, and the polarizers 44 and 42, allow substantially circularly-polarized light to enter the liquid crystal layer 50 from both the TFD array substrate 18 and the counter substrate 25. The backlight 64 having a light source 61, a reflector 62, and an optical waveguide 63 are provided outside a liquid crystal cell, that is, on the backside of the counter substrate 25.

As shown in FIGS. 2 and 5, in the liquid crystal display device 10 of the embodiment, the pixel electrode 9 and the common electrode 14 are displaced from one another in the surface direction, such that the alignment of liquid crystal molecules of the liquid crystal layer 50 are controlled. In other words, outer edges X1 and X2 of each pixel electrode 9 are positioned inside or outside outer edges Y1 and Y2 of each common electrode 14. For example, the outer edge X1 of the pixel electrode 9 is positioned inside the outer edge Y1 of the common electrode 14 (inside the corresponding dot area), and the outer edge X2 of the pixel electrode 9 is positioned outside the outer edge Y2 of the common electrode 14 (outside the corresponding dot area).

The above-described structure can produce the following effects. Generally, the application of a voltage to liquid crystal molecules with negative dielectric anisotropy, which are aligned on a vertical alignment film with no rubbing treatment, results in poor alignment, since molecular tilt directions which are not under control vary. In the embodiment, however, each of the rectangular pixel electrode 9 and the strip common electrode 14 are displaced from one another within a dot area. As a result, a tilted electric field (see FIG. 5) is produced between pixel electrodes 9 and common electrodes 14, in the area where the displacement occurs. Thus, the tilt direction of liquid crystal molecules, which are vertically aligned in an initial state and are tilted by an application of a voltage, is controlled depending on the tilted electric field.

Since occurrence of disclination due to poor alignment of liquid crystal molecules is thus reduced, the occurrence of afterimages and unevenness of images when viewed from an angle, which are associated with disclination, can also be reduced, and a high quality display can be achieved. Moreover, since displacement of each electrode for controlling the alignment of liquid crystal molecules occurs at the edges (outer edges) of dot areas, various grayscale levels can be displayed even in the edges (outer edges) of the dot area, and a display with higher brightness in the entire dot area can thus be achieved.

In the liquid crystal display device 10 of the present embodiment, the thickness of the liquid crystal layer 50 in the reflective display area R is about half that in the transmissive display area T, since the insulating films 21 are disposed in the reflective display areas R. Therefore, retardation in reflective display and that in transmissive display are substantially equal, and display contrast can thus be improved.

Figures 6A, 6B:
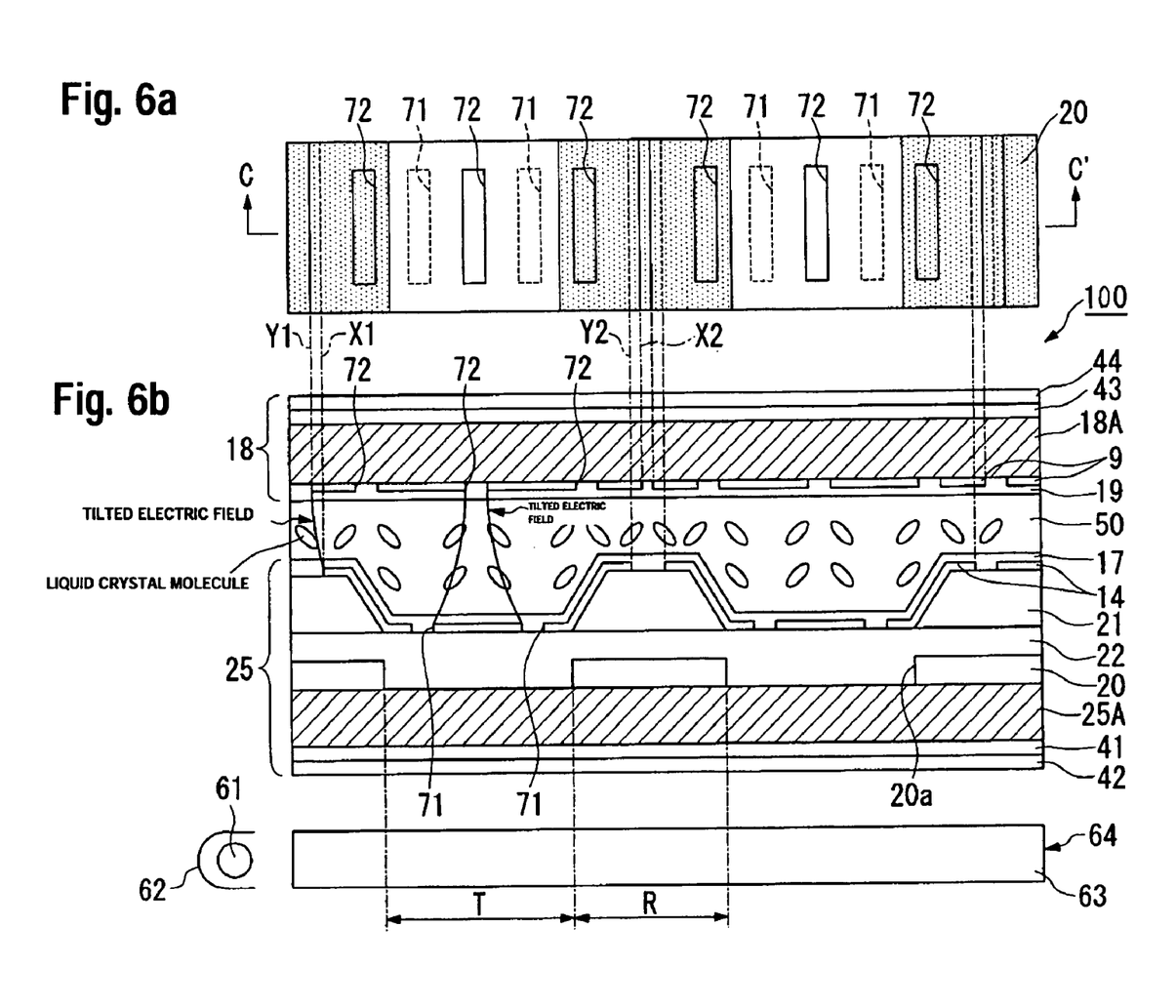
FIG. 6 is a cross-sectional view of the liquid crystal display device according to the second embodiment.

The liquid crystal display device of a second embodiment will now be described with reference to the drawings. FIG. 6 includes FIG. 6(b) showing a cross-sectional view of a liquid crystal display device 100 according to the second embodiment, and FIG. 6(a) showing a plan view of the electrodes of the liquid crystal display device. Since the liquid crystal display device 100 of this embodiment has basically the same structure as that of the first embodiment, components shown in FIG. 6 that are identical to those in FIG. 5 are denoted by the same reference numerals, and the detailed descriptions will be omitted here. FIG. 6(b) shows a cross-section along C–C' in FIG. 6(a).

In the liquid crystal display device 100 of the second embodiment, slit apertures 72 and 71 are provided on the pixel electrode 9 and the common electrode 14, respectively. In a dot area, the apertures 72 of the pixel electrode 9 and the apertures 71 of the common electrode 14 alternately appear. In other words, any aperture 72 (71) and its adjacent aperture are separately arranged in different electrodes.

Further, the outer edges of the electrode that has the outermost apertures 72 or 71 in the dot area are positioned outside the outer edges of the other electrode. That is, as shown in FIG. 6, the apertures 72 of the pixel electrode 9 are relatively close to the outer edges, at both the "X1 and Y1" side, and the "X2 and Y2" side. Thus, the outer edges Y1 and X2 of the pixel electrode 9 are positioned outside the outer edges X1 and Y2 of the common electrode 14.

Since the slit apertures 72 and 71 are provided on the pixel electrode 9 and the common electrode 14, respectively, tilted electric fields corresponding to the apertures 72 and 71 are produced between the pixel electrode 9 and the common electrode 14, as shown in FIG. 6. Thus, the tilt directions of the liquid crystal molecules, which are vertically aligned in an initial state and are tilted by an application of a voltage, are controlled depending on the tilted electric field. Moreover, since the apertures 72 and 71 are alternately provided on different electrodes, the tilt directions of the liquid crystal molecules are precisely controlled, as shown in FIG. 6, and the occurrence of improperly aligned domains is reduced. In other words, the occurrence of discontinuities in the tilt directions is reduced, and the liquid crystal molecules are properly aligned in multiple domains.

Moreover, similarly to the first embodiment, each of the electrodes 9 and 14 are displaced from one another at the edges (outer edges) of the dot area for controlling the alignment of the liquid crystal molecules depending on the tilted electric fields. Various grayscale levels can thus be displayed even in the edges (outer edges) of the dot area, and a display with higher brightness in the entire dot area is achieved.

In the liquid crystal display device 100 of the present embodiment, therefore, the occurrence of disclination due to poor alignment of the liquid crystal molecules is reduced in the entire dot area, and further, in the entire display area. The occurrence of afterimages and unevenness of images when viewed from an angle is also reduced, and a high quality display can thus be achieved.

Figure 7:
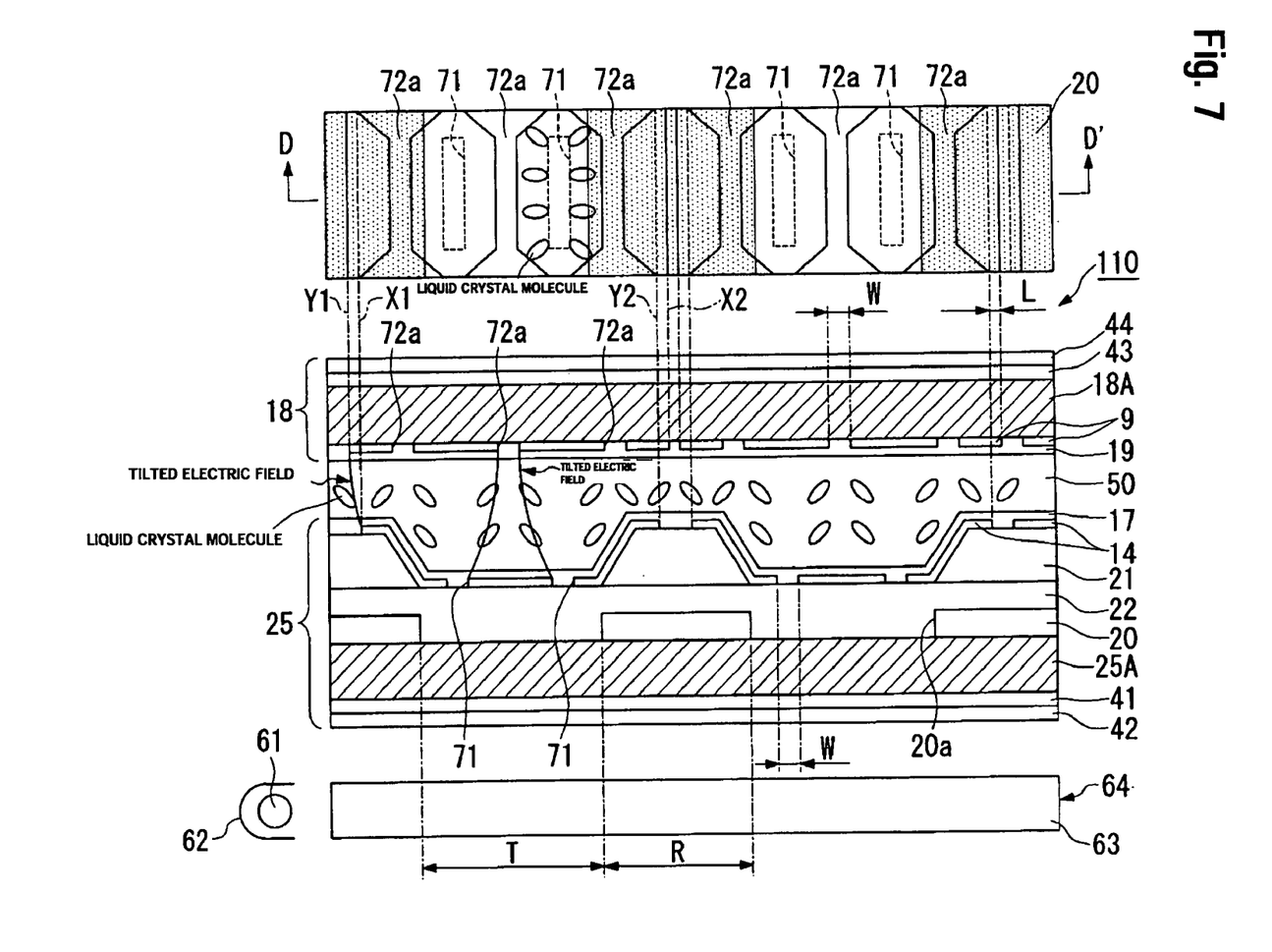
FIG. 7 is a cross-sectional view of the liquid crystal display device according to the third embodiment.

The liquid crystal display device of a third embodiment will now be described with reference to the drawings. FIG. 7 includes FIG. 7(b) showing a cross-sectional view of a liquid crystal display device 110 of the third embodiment, and FIG. 7(a) showing a plan view of the electrodes of the liquid crystal display device. Since the liquid crystal display device 110 of this embodiment has basically the same structure as that of the second embodiment, components shown in FIG. 7 that are identical to those in FIG. 6 are denoted by the same reference numerals, and the detailed descriptions will be omitted here. FIG. 7(b) shows a cross-section along D–D' in FIG. 7(a).

In the liquid crystal display device 110 of the third embodiment, slit apertures 72a and 71 are provided on the pixel electrode 9 and the common electrode 14, respectively. As shown in FIG. 7(a), the apertures 72a of the pixel electrode 9 surround the apertures 71 of the common electrode 14, and preferably, are of substantially rectangular shapes surrounding the apertures 71.

In a dot area, the apertures 72a of the pixel electrode 9 and the apertures 71 of the common electrode 14 alternately appear. In other words, any aperture 72a (71) and its adjacent aperture are separately arranged in different electrodes. Further, the outer edges of the electrode that has the outermost apertures 72a or 71 in the dot area are positioned outside the outer edges of the other electrode. That is, as shown in FIG. 7, the apertures 72a of the pixel electrode 9 are relatively close to the outer edges, at both the "X1 and Y1" side, and the "X2 and Y2" side. Thus, the outer edges Y1 and X2 of the pixel electrode 9 are positioned outside the outer edges X1 and Y2 of the common electrode 14.

Since the slit apertures 72a and 71 are provided on the pixel electrode 9 and the common electrode 14, respectively, tilted electric fields corresponding to the apertures 72a and 71 are produced between the pixel electrode 9 and the common electrode 14, as shown in FIG. 7. Thus, the tilt direction of the liquid crystal molecules, which are vertically aligned in an initial state and are tilted by an application of a voltage, is controlled depending on the tilted electric field. Moreover, since the apertures 72a of the pixel electrode 9 surround the apertures 71 of the common electrode 14, as shown in FIG. 7(a), the liquid crystal molecules are tilted around the apertures 71, in all directions of about 360 degrees.

Similarly to the second embodiment, since the apertures 72a and 71 are alternately provided on the different electrodes, the occurrence of discontinuities in the tilt directions is reduced, as shown in FIG. 7, and the liquid crystal molecules are properly aligned in multiple domains. Similarly to the second embodiment, moreover, each of the electrodes 9 and 14 are displaced from one another at the edges (outer edges) of the dot area for controlling the alignment of the liquid crystal molecules depending on the tilted electric fields. Various grayscale levels can thus be displayed even in the edges (outer edges) of the dot area, and a display with higher brightness in the entire dot area is achieved.

As shown in FIG. 7, the displacement distance L between the pixel electrode 9 and the common electrode 14 is preferably about W/2, where W is the width (slit width) of the aperture 72a on the pixel electrode 9, and the width (slit width) of the aperture 71 on the common electrode 14. Similarly to the effect of the apertures 72a and 71 of each electrode 9 and 14, this allows the tilted electric fields to be applied from the edges (outer edges) to the inside of the dot area. If the displacement distance L is below W/2, the effect of the tilted electric fields may be reduced. On the other hand, if the displacement distance L is above W/2, areas where no electrode is provided increase. This can lead to reduction in the aperture ratio, since the liquid crystal molecules are not driven in such areas. This relationship between the slit aperture width W and the displacement distance L is preferably applied to the other embodiments. In particular, the aperture width W is about 10 μm, and the displacement distance L is about 5 μm.

Figure 8A:
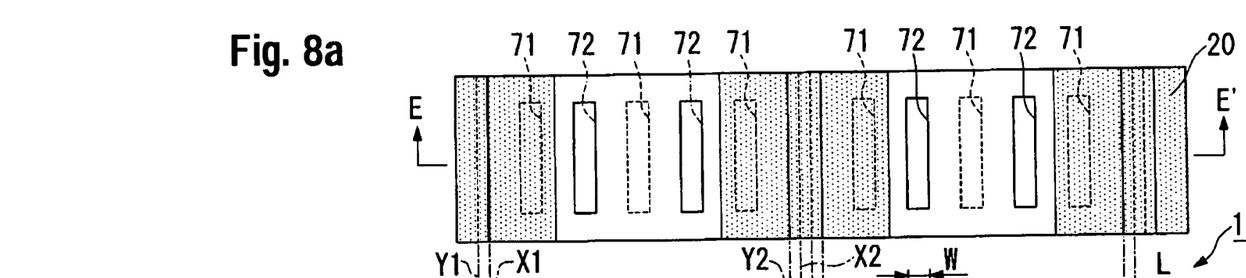
FIG. 8 is a cross-sectional view of the liquid crystal display device according to the fourth embodiment.
Figure 8B:
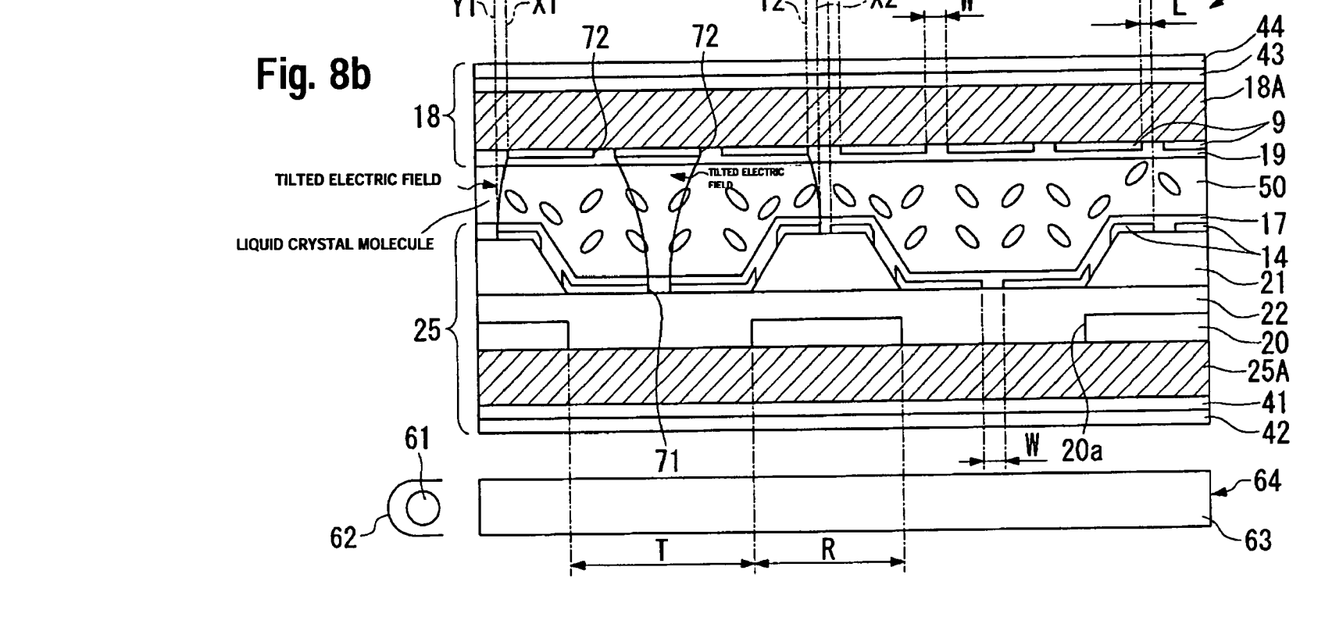

The liquid crystal display device of a fourth embodiment will now be described with reference to the drawings. FIG. 8 includes FIG. 8(b) showing a cross-sectional view of a liquid crystal display device 120 of the fourth embodiment, and FIG. 8(a) showing a plan view of the electrodes of the liquid crystal display device. Since the liquid crystal display device 120 of this embodiment has basically the same structure as that of the second embodiment, components shown in FIG. 8 that are identical to those in FIG. 6 are denoted by the same reference numerals, and the detailed descriptions will be omitted here. FIG. 8(b) shows a cross-section along E–E' in FIG. 8(a).

In the liquid crystal display device 120 of the fourth embodiment, the positions of the apertures 72 and 71 on the pixel electrode 9 and the common electrode 14 in the liquid crystal display device 110 of the third embodiment are reversed. In other words, in the embodiment, the outermost apertures in a dot area are provided on the common electrode 14, and accordingly, the outer edges of the common electrode 14 are positioned outside the outer edges of the pixel electrode 9.

Since the slit apertures 72 and 71 are provided on the pixel electrode 9 and the common electrode 14, respectively, tilted electric fields corresponding to the apertures 72 and 71 are produced between the pixel electrode 9 and the common electrode 14. Thus, the tilt directions of the liquid crystal molecules, which are vertically aligned in an initial state and are tilted by an application of a voltage, are controlled depending on the tilted electric fields. Moreover, since the apertures 72 and 71 are alternately provided on different electrodes, the occurrence of discontinuity in the tilt directions is reduced, and the liquid crystal molecules are properly aligned in multiple domains. Moreover, similarly to the second embodiment, each of the electrodes 9 and 14 are displaced from one another at the edges (outer edges) of the dot area for controlling the alignment of the liquid crystal molecules depending on the tilted electric fields. Various grayscale levels can thus be displayed even in the edges (outer edges) of the dot area, and a display with higher brightness in the entire dot area is achieved.

In the liquid crystal display device 120 of the fourth embodiment in FIG. 8, the apertures 72 of the pixel electrode 9 may surround the apertures 71 of the common electrode 14, as shown in, for example, FIG. 7.

Figure 9:
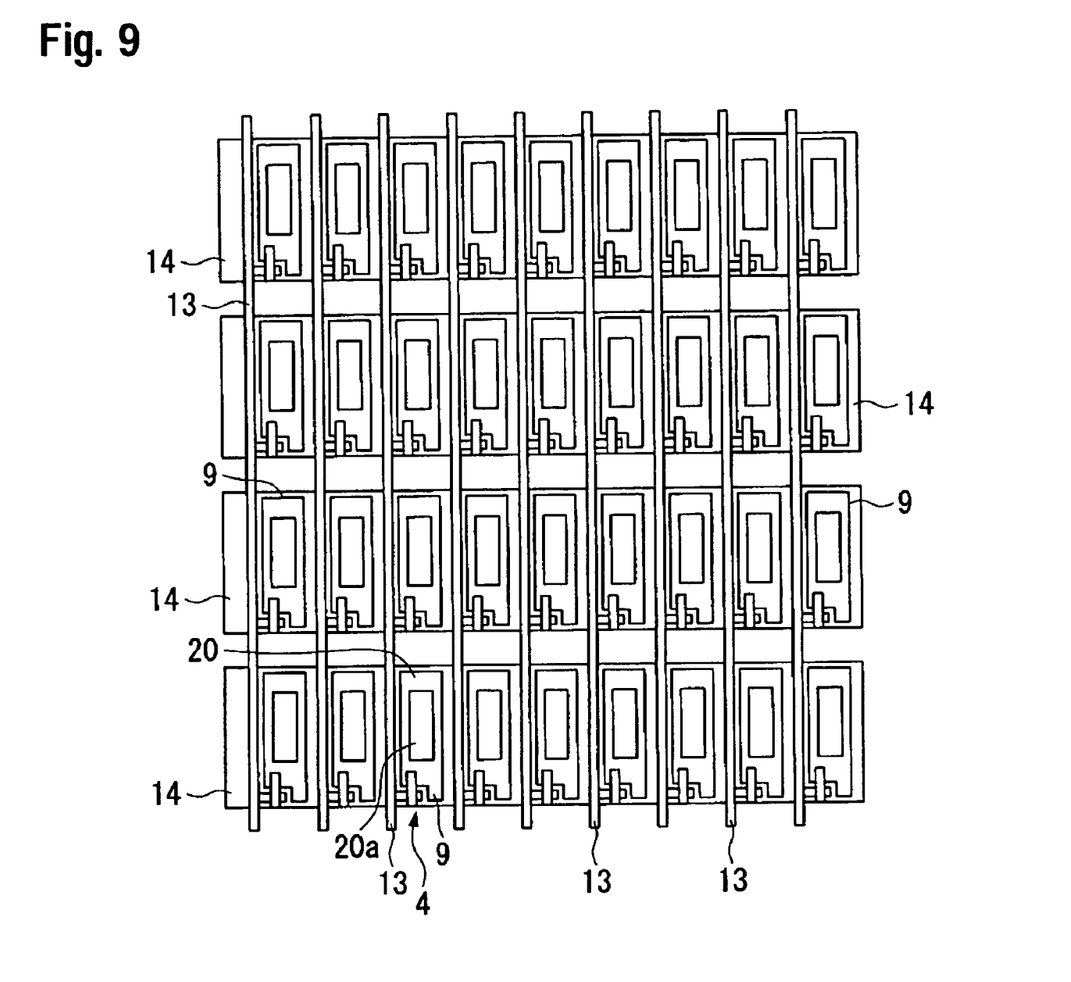
FIG. 9 is a plan view showing an example of the formation of the electrodes that can be applied to the embodiments.
Figure 10:
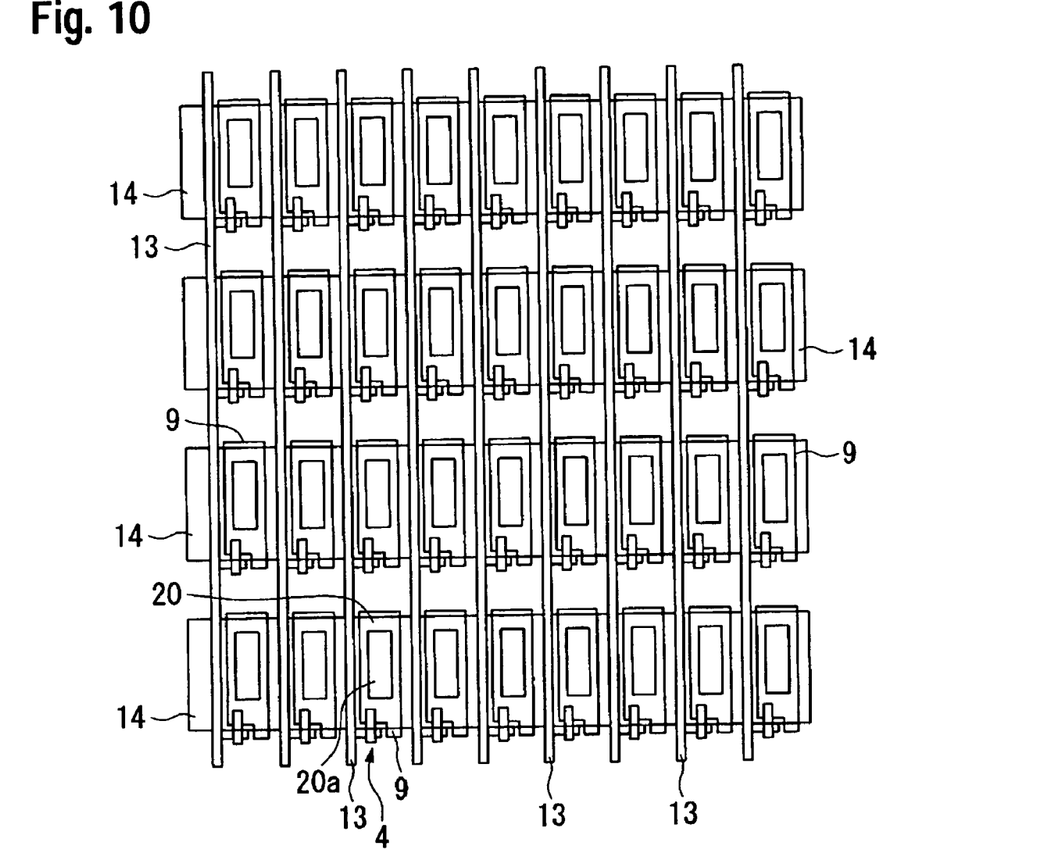
FIG. 10 is a plan view showing an example of the formation of the electrodes that can be applied to the embodiments.

As can be seen from the second, third, and fourth embodiments of the invention, the outer edges of the pixel electrode 9 in a dot area may be positioned inside those of the common electrode 14 as shown in FIG. 9, or positioned outside those of the common electrodes 14 as shown in FIG. 10, depending on the formation of the apertures in the dot area. Alternatively, as shown in FIG. 2, one of the outer edges of the pixel electrode 9 in a dot area may be positioned inside that of the common electrodes 14, and the other may be positioned outside that of the common electrodes 14.

Figure 11:
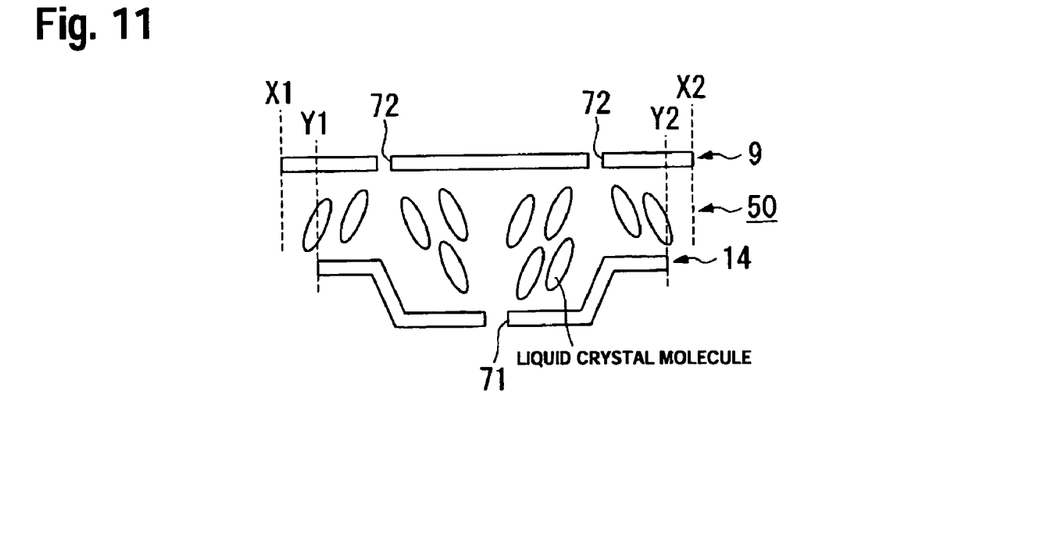
FIG. 11 is a cross-sectional view showing an example of the formation of the apertures provided on the electrodes.

In the embodiments described above, as shown in FIG. 11, the slit apertures 72 and 71 are provided on the pixel electrode 9 and the common electrode 14, respectively, to produce the tilted electric fields for controlling the alignment of the liquid crystal molecules. Alternatively, for example, as shown in FIG. 12, ribs (protrusions) 73 protruding into the liquid crystal layer 50 may be provided on the pixel electrode 9 and/or the common electrode 14 for controlling the alignment of the liquid crystal molecules.

Figure 12:
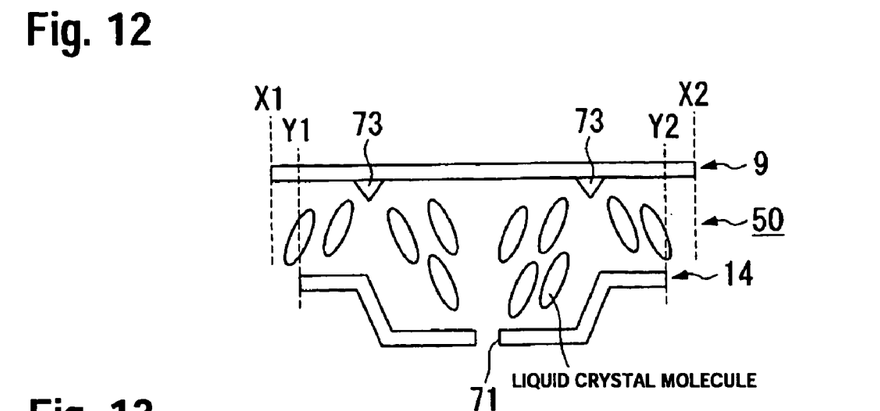
FIG. 12 is a cross-sectional view showing an example of the formation of the aperture and the ribs provided on the electrodes.

The rib 73 in FIG. 12 is triangular in cross section, shows a slit-like shape in plan view, similarly to the apertures of the above embodiments, and is formed of dielectric material, such as acrylic resin. The surface of the rib 73, which is provided on the pixel electrode 9 and/or the common electrode 14, is covered with a vertical alignment film. The alignment of the liquid crystal molecules is thus controlled by the ribs 73 alone or in combination with the apertures.

Figure 13:
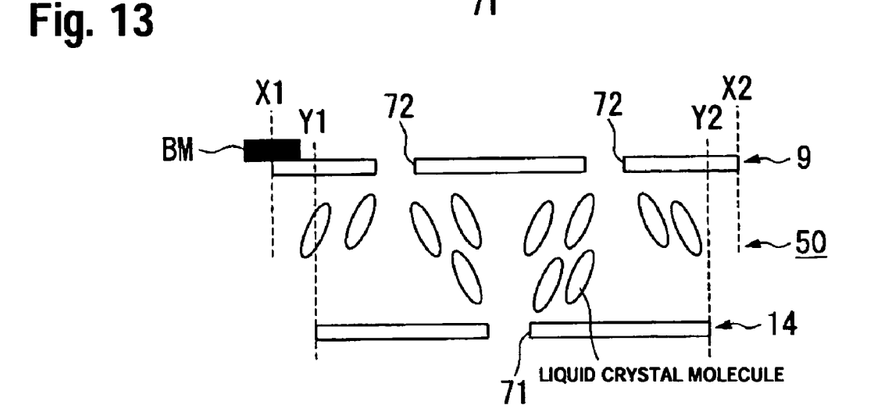
FIG. 13 is a cross-sectional view showing an example of the formation of the black matrix.

In the above embodiments, moreover, as shown in FIG. 13, a black matrix BM disposed between the neighboring dot areas is preferably positioned outside the outer edge of one of the pixel electrode 9 and the common electrode 14 having the outer edge being positioned inside that of the other electrode (in FIG. 13, the outer edge Y1 of the common electrode 14).

The black matrix BM normally covers the edge (outer edge) of the dot area, since the liquid crystal molecules are not easily driven in such an area.

According to the liquid crystal display devices of the above-described embodiments, however, the liquid crystal molecules even in the vicinity of the edges are driven by the tilted electric fields produced at the edges. Therefore, a bright display in the area between the outer edge X1 of the pixel electrode 9 and the outer edge Y1 of the common electrode 14 is ensured, and a black matrix BM of smaller size is required compared to that previously required. A display with higher brightness can thus be achieved by disposing the black matrix BM outside the outer edge Y1 of the common electrode 14, as shown in FIG. 13.

Figure 14:
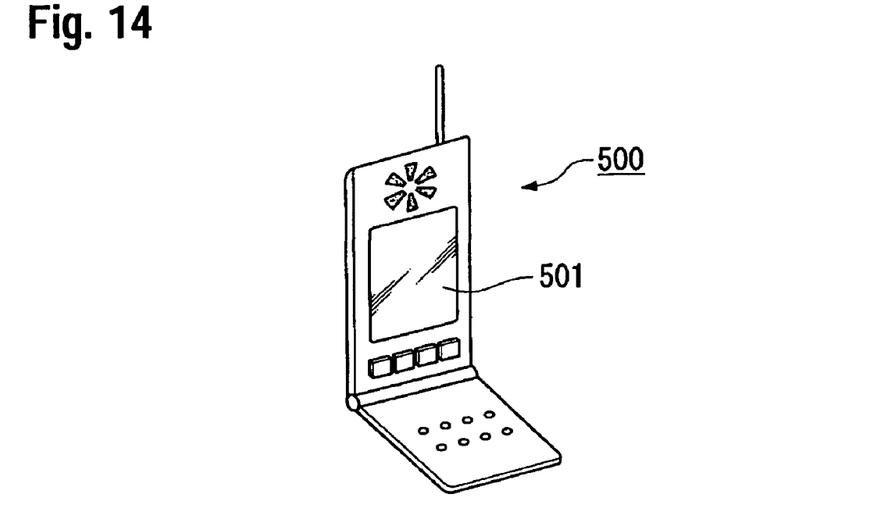
FIG. 14 is a perspective view showing an example of the electronic apparatus according to the invention.

An example of an electronic apparatus incorporating the liquid crystal display device of the above embodiments according to the invention will now be described. FIG. 14 is a perspective view showing an example of a mobile phone. In FIG. 14, reference numeral 500 denotes a main body of the mobile phone, while reference numeral 501 denotes a display panel incorporating the above-described liquid crystal display device. Since this electronic apparatus is provided with a display panel incorporating the liquid crystal display device of the above embodiments, a display with a high brightness regardless of the environment, a high contrast, and a wide viewing angle can be achieved. Since a high brightness and contrast in display is particularly significant in transmissive mode, the electronic apparatus with emphasis on transmissive display mode can be provided.

It should be understood that the scope of the invention is not limited to the embodiments described above, and various modifications can be made within the spirit and the scope of the present invention. In the embodiments described above, for example, each of the retardation films 41 and 42 formed of single plates may be replaced with a laminated plate formed of a ½ wave plate and a ¼ wave plate. This laminated plate serves as a broadband circular polarizer for achromatizing the black display. Moreover, in the above embodiments, the insulating films 21 for adjusting the thickness of the liquid crystal layer are not necessarily required, or may be provided not only on the base (lower substrate) 25A of the counter substrate 25, but also on the inner surface (liquid crystal layer side) of the base (upper substrate) 18A of the TFD array substrate 18.

What is claimed is:

1. A liquid crystal display device, comprising:
   a pair of substrates;
   a liquid crystal layer disposed between the substrates;
   common electrodes in the form of stripes arranged on an inner surface of one of the substrates; and
   pixel electrodes, having a generally rectangular shape, arranged on an inner surface of the other substrate;
   the liquid crystal layer including liquid crystal molecules with negative dielectric anisotropy, which are vertically aligned in an initial state;
   outer edges of the pixel electrodes being positioned inside or outside of corresponding outer edges of the common electrodes so that tilt directions of the vertically aligned liquid crystal molecules are controlled;
   at least one of slit apertures and protrusions being provided on at least one of the pixel electrodes and the common electrodes that control the tilt directions of the vertically aligned liquid crystal molecules;
   the outer edges of one of a pixel electrode and a common electrode having at least one of outermost apertures and protrusions within one pixel that are positioned outside the outer edges of the other electrode; and
   the outer edges of the pixel electrodes being positioned approximately W/2 inside or outside the outer edges of the common electrodes, where W is the width of at least one of an aperture and a protrusion.

2. The liquid crystal display device according to claim 1, tilted electric fields being produced between the pixel electrodes and the common electrodes by positioning the outer edges of the pixel electrodes inside or outside the corresponding outer edges of the common electrodes, so that the tilt directions of the liquid crystal molecules are controlled depending on the tilted electric fields.

3. The liquid crystal display device according to claim 1, at least one of the apertures and the protrusions being provided on both the pixel electrodes and the common electrodes, and being alternately arranged on different electrodes.

4. The liquid crystal display device according to claim 1,
   each of a plurality of dot areas including a transmissive display area for transmissive mode and a reflective display area for reflective mode; and
   adjusting layers being disposed between at least one of the pair of substrates and the liquid crystal layer, and at least in the reflective display area, the adjusting layer being disposed for varying a thickness of the liquid crystal layer between the reflective display area and the transmissive display area.

5. The liquid crystal display device according to claim 1, further comprising:
   a black matrix disposed between neighboring dot areas, the black matrix being disposed outside the outer edge of one of the pixel electrode and the common electrode having the outer edge being positioned inside that of the other electrode.

6. The liquid crystal display device according to claim 1, two-terminal nonlinear elements being coupled to the pixel electrodes.

7. An electronic apparatus, comprising the liquid crystal display device described in claim 1.

* * * * *